United States Patent
Kokawa

Patent Number: 4,853,939
Date of Patent: Aug. 1, 1989

[54] GAP SWITCH

[75] Inventor: Masashi Kokawa, Minami, Japan

[73] Assignee: Horiba, Ltd., Kyoto, Japan

[21] Appl. No.: 186,448

[22] Filed: Apr. 26, 1986

[51] Int. Cl.$^4$ .............................................. H01S 3/097
[52] U.S. Cl. ......................................... 372/81; 372/87
[58] Field of Search ........................ 372/87, 81, 58, 55

[56] References Cited
U.S. PATENT DOCUMENTS
4,223,279  9/1980  Bradford et al. ...................... 372/86
4,611,327  9/1986  Clark et al. ............................ 372/58

Primary Examiner—Lëon Scott, Jr.
Attorney, Agent, or Firm—Price, Gess & Ubell

[57] ABSTRACT

A gap switch includes an insulated vessel with hydrogen gas therein. A pair of directly-opposed electrodes cover two open end portions of the vessel. The two electrodes protrude into the interior of the vessel. A trigger pin with insulating material around it is within one of the electrodes and receives a pulsed voltage which thereby induces a discharge between the electrodes.

16 Claims, 1 Drawing Sheet

GAP SWITCH

BACKGROUND OF THE INVENTION

1. Field of the invention

The present invention generally relates to an improved gap switch used as a starting switch of, for example, a pulse discharge type gas laser.

2. Description of the Prior Art

A gap switch and a thyratron with $N_2$ gas (nitrogen gas) or $SF_6$ (sulfur hexafluoride gas) enclosed in a tube have been known as a starting switch of a pulse discharge type gas laser.

However, although the former of the abovedescribed prior art apparatus has been simple in construction and handy, it has exhibited disadvantages in that it takes time to extinguish ions of the enclosed gas generated by an electric discharge. A breakdown also occurs at low voltages according to certain circumstances and, as a result, only the repeated operation at about 100 Hz can be practiced and it is difficult to repeat operations at high frequencies (hereinafter referred to as "operations repeated at high frequencies"). In addition, although the latter of the above-described prior art apparatus is mainly used for large-scaled laser discharging of a large electric current and has stable working characteristics, it is remarkably expensive and a separate power source for heating a filament is required and, as a result, it is unsuitable for a small-sized laser.

The present invention was achieved in view of the above-described matters. Thus, it is an object of the present invention to provide an inexpensive gap switch that is simple in construction and capable of repeating operations at high frequencies.

SUMMARY OF THE INVENTION

In order to achieve the above-described object and others, a gap switch according to the present invention is characterized in that hydrogen gas is enclosed in an insulated vessel provided with a pair of electrodes therein.

With a gap switch according to the present invention, a breakdown voltage of hydrogen gas enclosed in the insulated vessel is nearly equal to that of $N_2$ gas, although an ion-diffusion coefficient of hydrogen gas is about five times that of $N_2$ gas. Accordingly, a recombination of ions is apt to occur on an inside wall of the insulated vessel and ions are speedily extinguished, so that the breakdown does not occur at low voltages even though operations are repeated at high frequencies.

DESCRIPTION OF THE PREFERRED EMBODIMENT

One preferred embodiment of the present invention is below-described with reference to the drawings.

Figure 1:
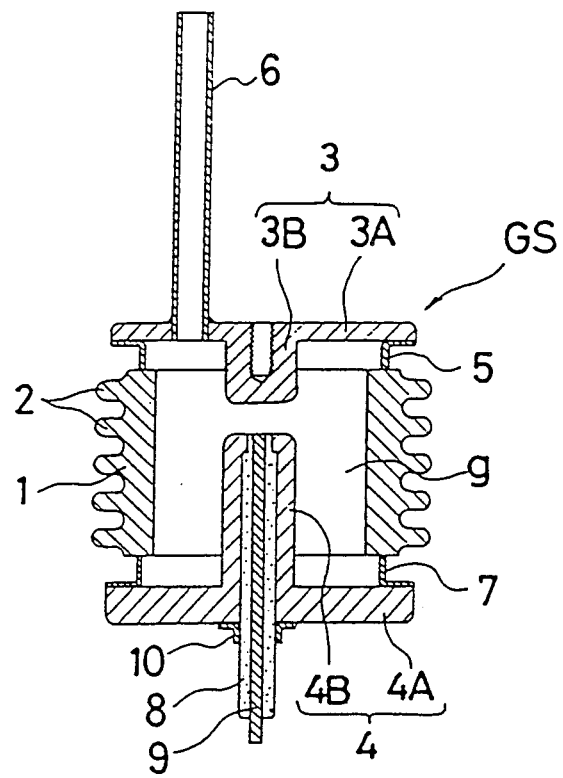
FIG. 1 is a sectional view showing one preferred embodiment of the gap switch according to the present invention.

Referring now to FIG. 1, showing one preferred embodiment of the gap switch GS according to the present invention, reference numeral 1 designates a cylindrical insulated vessel formed of an insulating material, such as ceramics, provided with a plurality of folds 2 on a periphery thereof.

Reference numerals 3, 4 designate electrodes disposed oppositely to each other for closing opened portions formed at both ends of the insulated vessel 1. The electrodes 3, 4 are formed of metallic materials, such as molybdenum and tungsten, and nearly centers of the opposite surfaces of both electrodes 3, 4 are projected so as to form an appointed distance therebetween.

That is to say, a flange-like member 5 formed of, for example, KOVAL (nickel alloys) is mounted on one end of the insulated vessel 1 by silver alloy brazing. The electrode 3 includes an end cover portion 3A and an electrode portion 3B projected toward an inside of the insulated vessel 1 at the vicinity of the center of the end cover portion 3A. The portions 3A, 3B are mounted on the flange-like member 5 at the end cover portion 3A by the silver alloy brazing to close one end portion of the insulated vessel 1. Reference numeral 6 designates a pipe for introducing hydrogen gas, the pipe standing on an outside surface of the end cover portion 3A so as to communicate with the inside of the insulated vessel.

In addition, a flange-like member 7 formed of KOVAL is also mounted on the other end portion of the insulated vessel 1 by silver alloy brazing. An electrode 4 includes an end cover portion 4A and an electrode portion 4B projected toward the inside of the insulated vessel 1 at the vicinity of the center of the end cover portion 4A. The portions 4A, 4B are mounted on the flange-like member 7 at the end cover portion 4A by silver alloy brazing to close the other end portion of the insulated vessel 1. A trigger pin 9 is inserted in the electrode 4 and extends from an outside of the end cover portion 4A through the electrode portion 4B and also through an insulating material 8 formed of ceramics and the like so as to be electrically insulated from the electrode 4. Thus, the end portion of the trigger pin 9 disposed within the insulated vessel 1 may be positioned on a surface nearly as high as a surface of the electrode portion 4B or slightly higher than the surface of the electrode portion 4B. In addition, an end portion of the trigger pin 9 disposed outside of the end cover portion 4A is projectedly mounted on the insulating material 8 under the coated condition to be connected with a pulse generator PG which will be mentioned later. Reference numeral 10 designates a silver alloy brazing portion for fixedly mounting the insulating material 8 on the outside surface of the end cover portion 4A.

Hydrogen gas g having a pressure of, for example, about 2 to 3 atm. is enclosed in the insulated vessel 1 with both ends closed in the above-described manner.

Figure 2:
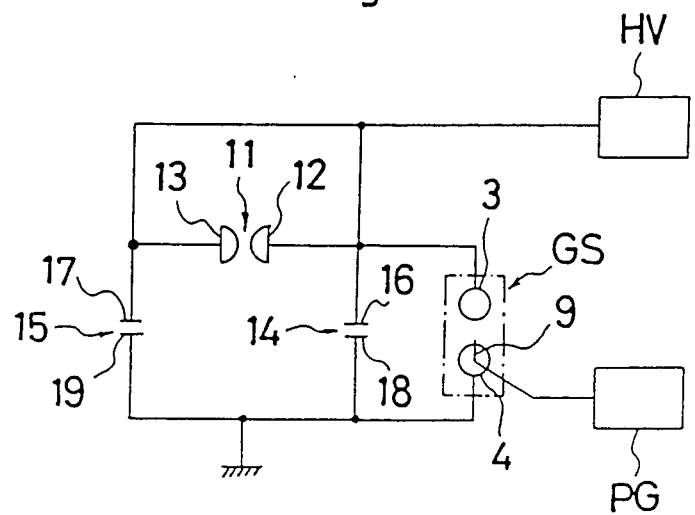
FIG. 2 is an electric circuit diagram of an $N_2$ laser device using the gap switch according to the present invention as a starting switch.

Referring to FIG. 2 showing an electric circuit diagram of an $N_2$ laser device as a pulse discharge-type gas laser using the gap switch GS constructed in the above-described manner as a starting switch, reference numeral 11 designates a laser main electrode comprising discharge electrodes 12, 13 oppositely disposed to one another with an appointed distance therebetween. Reference numerals 14, 15 designate condensers connected in parallel so as to be charged by a high-voltage power source HV. One condenser electrode 16 of the condenser 14 is connected with one discharge electrode 12, and one condenser electrode 17 of the condenser 15 is connected with the other discharge electrode 13. The other condenser electrodes 18, 19 of both condensers 14, 15 are grounded.

The gap switch GS is adapted to connect one electrode 3 thereof with one discharge electrode 12 of the laser main electrode 11 and one condenser electrode 16 of the condenser 14 and connect the other electrode 4 thereof with the other condenser electrodes 18, 19 of the condensers 14, 15.

PG designates a pulse generator and is controlled in relation to the high-voltage power source HV to give a pulse as a trigger having an appointed voltage to the trigger pin 9.

With the above-described construction, upon giving a trigger pulse of about 2 to 3 KV to the trigger pin 9 from the pulse generator HG under the condition that the condensers 14, 15 are charged by the highvoltage power source HV at the appointed voltage (14 to 15 KV), a small discharge occurs between the electrode portion 4B of the electrode 4 of the gap switch GS and the trigger pin 9 to induce a main discharge between the electrodes 3, 4, whereby the gap switch GS takes a closed condition in view of the circuit. At this time, an electric potential of the condenser electrodes 16, 18 of the condenser 14 is transiently reversed to apply a voltage about two times the applied voltage between the discharge electrodes 12, 13 of the laser main electrode 11, whereby an electric discharge occurs on the laser main electrode 11 to emit a desired laser beam.

Thus, the gap switch GS can be deemed as a thyristor at high voltages. As with the conventional gap switch, an electric discharge has occurred naturally between the electrodes 3, 4 according to circumstances prior to the application of the trigger pulse to the trigger pin 9 due to ions generated by the electric discharge in the operations repeated at high frequencies. But with the gap switch according to the present invention, although the breakdown voltage of hydrogen gas g enclosed in the insulated vessel 1 is nearly equal to that of $N_2$ gas, the ion-diffusion coefficient of hydrogen gas amounts to about five times that of $N_2$ gas and, accordingly, the recombination of ions is apt to occur on the inside wall of the insulated vessel 1 and the ions are speedily extinguished. Thus, the breakdown does not occur at low voltages even though operations are repeated at high frequencies.

In the case where a so-called pressure-resisting structure is given to the insulated vessel 1 of the gap switch GS by subjecting all joint portions to silver alloy brazing, hydrogen gas g can be enclosed in the insulated vessel 1 under a compressed condition and, as a result, a length of a gap between the electrodes 3, 4 can be reduced in comparison with a gap switch, in which a pressure of a gas enclosed in the insulated vessel 1 is low, and an inductance of the circuit can be reduced, so that a voltage between electrodes in the laser main electrode 11 can be increased, thereby increasing a laser output.

As above-described, with the gap switch according to the present invention, since hydrogen gas is enclosed in the insulated vessel provided with a pair of electrodes therein, no breakdown occurs at low voltages even though operations are repeated at high frequencies. Accordingly, operations can be repeated at frequencies of about 1 kHz. Incidentally, with a gap switch enclosing $N_2$ gas therein, a self-dielectric breakdown by residual ions occurred at about 300 Hz to disturb a normal operation.

The gap switch according to the present invention is particularly suitable as a starting switch for repeating operations at high frequencies in a pulse discharge-type gas laser, but it is to be understood that it has other uses.

What is claimed is:

1. In a pulse discharge-type gas laser device, an improved starting assembly constituting a gap switch, comprising:
    an insulated vessel filled with hydrogen gas which is present at about two to three atmospheres of pressure so as to maximize ion extension and maximize a breakdown voltage;
    a first electrode in a T-shaped configuration extending interiorly of said vessel, and covering an open end of said vessel said first electrode being connected to a discharge electrode of said laser device;
    a second electrode in a T-shaped configuration also extending interiorly of said vessel and covering another open end of said vessel such that said first electrode and second electrode are aligned end-to-end with one another so that an appointed distance between them within said vessel is minimized, said second electrode being connected to a condenser electrode of said laser device; and
    a trigger pin in said second electrode which receives a pulsed voltage.

2. The gap switch according to claim 1 further including a pair of end cover portions on said electrodes at opposite sides of said vessel.

3. The gap switch according to claim 1 wherein said trigger pin is disposed along and within said second electrode.

4. The gap switch according to claim 3 further including an insulating material surrounding said trigger pin.

5. The starting assembly according to claim 1 wherein said vessel is made of a ceramic material.

6. The starting assembly according to claim 5 wherein said first electrode and second electrode are made of one of molybdenum and one of tungsten.

7. In a pulse discharge-type gas laser device, an improved starting assembly constituting a gap switch, comprising:
    an insulated vessel;
    a pair of electrodes in an end-to-end relationship in the insulated vessel; and
    hydrogen gas enclosed in said insulated vessel so as to maximize a breakdown voltage and thereby allow operation of said gap switch at frequencies of about 1 kHz.

8. The gap switch according to claim 7 wherein said vessel includes a plurality of folds on a periphery thereof.

9. The gap switch according to claim 7 wherein said electrodes include end cover portions which cover ends of said vessel which would otherwise remain open.

10. The gap switch according to claim 7 wherein said electrodes have a T-shaped configuration.

11. The gap switch according to claim 7 wherein said electrodes extend outside of said vessel.

12. In a pulse discharge-type gas laser device, an improved gap switch, comprising:
    an insulated vessel having a first open end and a second open end;
    a first electrode fixedly attached to said vessel at the first open end, said first electrode having a first end cover portion that is disposed across the first open end and also having a first electrode portion that projects into said vessel;
    a second electrode fixedly attached to said vessel at the second open end, said second electrode having a second end cover portion that is disposed across the second open end and also having a second electrode portion that projects into said vessel while in an end-to-end relation to said first electrode portion said first and second electrodes providing a pressure-resistant character to said;

a trigger pin disposed in one of said first electrode portion and second electrode portion, said trigger pin extending beyond one of said first cover portion and said second cover portion to a position outside of said vessel;

an insulating material surrounding said trigger pin; and a pressurized hydrogen gas in said vessel to minimize a distance between said first and second electrode portion.

13. The improvement according to claim 12 further including a pipe for introducing hydrogen gas into said vessel, said pipe being affixed at one of said first end cover portion and second end cover portion.

14. The improvement according to claim 13 further including a first flange-like member mounted to said vessel at said first open end and upon which said first end cover portion is affixed.

15. The improvement according to claim 14 further including a second flange-like member mounted to said vessel at said second open end and upon which said second end cover portion is affixed.

16. The improvement according to claim 15 further including a plurality of folds on a periphery of said vessel.

* * * * *

UNITED STATES PATENT OFFICE
CERTIFICATE OF CORRECTION

Patent No. 4,853,939      Dated August 1, 1989

Inventor(s) Masashi Kokawa

It is certified that error appears in the above-identified patent and that said Letters Patent is hereby corrected as shown below:

On the cover page, [22] Filed: delete "Apr. 26, 1986" and insert --Apr. 26, 1988--.

Signed and Sealed this

Nineteenth Day of June, 1990

*Attest:*

HARRY F. MANBECK, JR.

*Attesting Officer*      *Commissioner of Patents and Trademarks*